(12) United States Patent
Kondo

(10) Patent No.: US 11,609,733 B2
(45) Date of Patent: Mar. 21, 2023

(54) INFORMATION PROCESSING DEVICE, CONTROL METHOD FOR INFORMATION PROCESSING DEVICE, AND PRINTING DEVICE FOR GENERATING SUBFOLDER IN MAIN HOT FOLDER

(71) Applicant: SEIKO EPSON CORPORATION, Tokyo (JP)

(72) Inventor: Toshiya Kondo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/519,481

(22) Filed: Nov. 4, 2021

(65) Prior Publication Data
US 2022/0137887 A1 May 5, 2022

(30) Foreign Application Priority Data
Nov. 4, 2020 (JP) .............................. JP2020-184333

(51) Int. Cl.
*G06F 3/12* (2006.01)
(52) U.S. Cl.
CPC ............ *G06F 3/127* (2013.01); *G06F 3/1204* (2013.01); *G06F 3/1265* (2013.01)
(58) Field of Classification Search
None
See application file for complete search history.

(56) References Cited

U.S. PATENT DOCUMENTS

| | | | |
|---|---|---|---|
| 8,321,560 B1* | 11/2012 | Pai ...................... | G06F 11/0793 709/224 |
| 2007/0086038 A1* | 4/2007 | Matsuzaki ............ | G06F 3/1285 358/1.15 |
| 2010/0179965 A1* | 7/2010 | Koshigaya ............ | G06F 21/608 707/783 |
| 2017/0220546 A1* | 8/2017 | Codrington ............. | G06F 16/93 |

FOREIGN PATENT DOCUMENTS

JP 2008077323 A 4/2008

\* cited by examiner

*Primary Examiner* — Miya J Williams
(74) *Attorney, Agent, or Firm* — Chip Law Group

(57) ABSTRACT

A printer includes: a printer storage unit storing a sub hot folder that is given a folder name including a keyword corresponding to a print condition and is thus associated with the print condition; and a printer control unit preparing the sub hot folder and causing the printer storage unit to store the prepared sub hot folder. The printer control unit accepts an input of the folder name, and prepares the sub hot folder given the accepted folder name and causes the printer storage unit to store the sub hot folder when the sub hot folder associated with the same print condition as the print condition corresponding to the keyword included in the accepted folder name is not stored in the printer storage unit.

9 Claims, 11 Drawing Sheets

INFORMATION PROCESSING DEVICE, CONTROL METHOD FOR INFORMATION PROCESSING DEVICE, AND PRINTING DEVICE FOR GENERATING SUBFOLDER IN MAIN HOT FOLDER

The present application is based on, and claims priority from JP Application Serial Number 2020-184333, filed Nov. 4, 2020, the disclosure of which is hereby incorporated by reference herein in its entirety.

BACKGROUND

1. Technical Field

The present disclosure relates to an information processing device, a control method for an information processing device, and a printing device.

2. Related Art

According to the related art, printing using a hot folder is known.

For example, JP-A-2008-77323 discloses a hot folder in which, when a file is saved, a print attribute that is a print condition associated therewith can be changed.

Generally, a manager of a printing device or a vender of the printing device associates a print condition with a hot folder as described in JP-A-2008-77323. Therefore, some users of the printing device may not be able to grasp what print condition is associated with the hot folder. Depending on the user of the printing device, printing may be performed with an unintended print condition when using the hot folder.

SUMMARY

An information processing device as an aspect of the present disclosure includes: a storage unit storing a first hot folder that is given a folder name including a keyword corresponding to a print condition and is thus associated with the print condition; and a control unit preparing the first hot folder and causing the storage unit to store the first hot folder that is prepared. The control unit accepts an input of the folder name, and prepares the first hot folder given the folder name that is accepted and causes the storage unit to store the first hot folder when the first hot folder associated with the print condition that is the same as the print condition corresponding to the keyword included in the folder name that is accepted is not stored in the storage unit.

A control method for an information processing device as an aspect of the present disclosure includes: storing a first hot folder that is given a folder name including a keyword corresponding to a print condition and is thus associated with the print condition; accepting an input of the folder name; and preparing and storing the first hot folder given the folder name that is accepted, when the first hot folder associated with the print condition that is the same as the print condition corresponding to the keyword included in the folder name that is accepted is not stored.

A printing device as an aspect of the present disclosure includes: a printing unit; a printing device storage unit storing a first hot folder that is given a folder name including a keyword corresponding to a print condition and is thus associated with the print condition; and a printing device control unit monitoring whether image data is saved in the first hot folder or not, and causing the printing unit to print based on the image data saved with the print condition associated with the first hot folder, when the image data is saved in the first hot folder. The printing device control unit accepts an input of the folder name, and prepares the first hot folder given the folder name that is accepted and causes the printing device storage unit to store the first hot folder when the first hot folder associated with the print condition that is the same as the print condition corresponding to the keyword included in the folder name that is accepted is not stored in the printing device storage unit.

DESCRIPTION OF EXEMPLARY EMBODIMENTS

First Embodiment

First, a first embodiment will be described.

Figure 1:
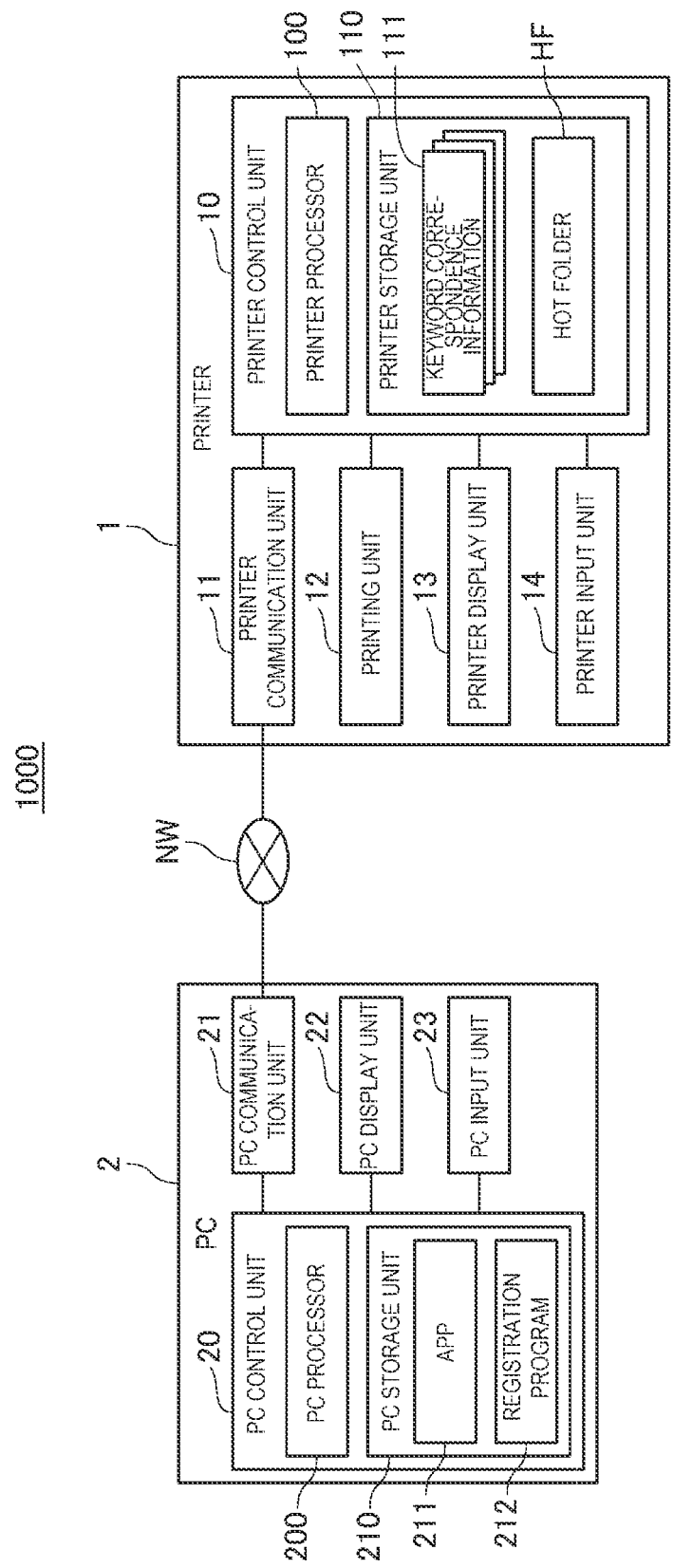
FIG. 1 shows the configuration of a printing system.

FIG. 1 shows the configuration of a printing system 1000.

The printing system 1000 is a system that can print using a hot folder HF. The hot folder HF is a folder associated with a print condition and configured for printing based on image data saved with a print condition associated with a printer 1.

The printer 1 in this embodiment is equivalent to an example of a printing device and an information processing device.

The printing system 1000 has the printer 1 and a PC (personal computer) 2. The printer 1 and the PC 2 are coupled to a network NW. The network NW may be a local network or a global network such as the internet, a dedicated circuit or a public circuit.

The PC 2 may be a laptop PC, a desktop PC, a tablet PC or a smartphone.

The printer 1 is a device printing an image on a print medium. The print medium is not limited any particular type and may be a cut paper with a predetermined size, a roll paper, a synthetic resin sheet or the like. The printing method of the printer 1 is not particularly limited. A dot impact printing method, a thermal sublimation printing method, a thermal printing method or the like can be employed. In each embodiment, a case where the printer 1 employs an inkjet printing method is described as an example.

First, the configuration of the PC 2 will be described.

The PC 2 has a PC control unit 20, a PC communication unit 21, a PC display unit 22, and a PC input unit 23.

The PC control unit 20 has a PC processor 200 which is a processor executing a program, such as a CPU (central processing unit) or an MPU (micro-processing unit), and a PC storage unit 210, and controls each part of the PC 2. In the PC control unit 20, the PC processor 200 reads out a program stored in the PC storage unit 210 and executes various kinds of processing via hardware and software.

The PC storage unit 210 stores a program executed by the PC processor 200 and data processed by the PC processor 200. The PC storage unit 210 stores a program executed by the PC processor 200, an app 211, a registration program 212, and various other data. The PC storage unit 210 may store a printer driver corresponding to the printer 1. The PC storage unit 210 has a non-volatile storage area. The PC storage unit 210 may have a volatile storage area and form a work area for the PC processor 200.

The app 211 is an application program for generating image data. The data format of the image data generated by the app 211 is, for example, PDF (Portable Document Format), Word format or the like.

The registration program 212 is a program for registering a main hot folder MHF and a keyword KW to the printer 1. The main hot folder MHF and the keyword KW will be described later. Registering a main hot folder MHF to the printer 1 means storing a new main hot folder MHF in a printer storage unit 110. Registering a keyword KW to the printer 1 means storing new keyword correspondence information 111 in the printer storage unit 110. The keyword correspondence information 111 will be described later.

The PC communication unit 21 has communication hardware communicating according to a predetermined communication standard and communicates with the printer 1 coupled via the network NW under the control of the PC control unit 20. The PC communication unit 21 transmits image data generated by the function of the app 211 to the printer 1.

The PC display unit 22 is a display formed of an LED (light-emitting diode), an OLED (organic light-emitting diode) or the like, and displays information in a predetermined form under the control of the PC control unit 20. The PC display unit 22 may be an external device coupled to the PC 2.

The PC input unit 23 is an input interface which is coupled to an input unit such as an operation switch, a touch input panel, a mouse or a keyboard provided for the PC 2, and which detects an input operation by the user and outputs the result of the detection to the PC control unit 20. The PC control unit 20 executes processing corresponding to the input operation, based on the input from the PC input unit 23.

The configuration of the printer 1 will now be described.

The printer 1 has a printer control unit 10, a printer communication unit 11, a printing unit 12, a printer display unit 13, and a printer input unit 14.

The printer control unit 10 in this embodiment is equivalent to an example of a control unit and a printing device control unit.

The printer control unit 10 has a printer processor 100 which is a processor executing a program, such as a CPU or an MPU, and a printer storage unit 110, and controls each part of the printer 1. In the printer control unit 10, the printer processor 100 reads out a program stored in the printer storage unit 110 and executes various kinds of processing via hardware and software.

The printer storage unit 110 in this embodiment is equivalent to an example of a storage unit and a printing device storage unit.

The printer storage unit 110 stores a program executed by the printer processor 100 and data processed by the printer processor 100. The printer storage unit 110 stores a program executed by the printer processor 100, keyword correspondence information 111, a hot folder HF, and various other data. The printer storage unit 110 has a non-volatile storage area. The printer storage unit 110 may have a volatile storage area and form a work area for the printer processor 100.

The printer communication unit 11 has communication hardware communicating according to a predetermined communication standard and communicates with the PC 2 coupled via the network NW under the control of the printer control unit 10.

The printing unit 12 has a printing mechanism for printing an image on a print medium. The printing unit 12 has a carrier mechanism for carrying a print head ejecting an ink and a print medium. The printing unit 12 may have various sensors detecting the position and size of the print medium, a head scanning mechanism causing the print head to scan, and the like.

The printer display unit 13 is a display formed of an LED (light-emitting diode), an OLED (organic light-emitting diode) or the like, and displays information in a predetermined form under the control of the printer control unit 10. The printer display unit 13 may be an external device coupled to the printer 1.

The printer input unit 14 is an input interface which is coupled to an input unit such as an operation switch, a touch input panel, a mouse or a keyboard provided for the printer 1, and which detects an input operation by the user and outputs the result of the detection to the printer control unit 10. The printer control unit 10 executes processing corresponding to the input operation, based on the input from the printer input unit 14.

As described above, the printer storage unit 110 stores a hot folder HF.

Figure 2:
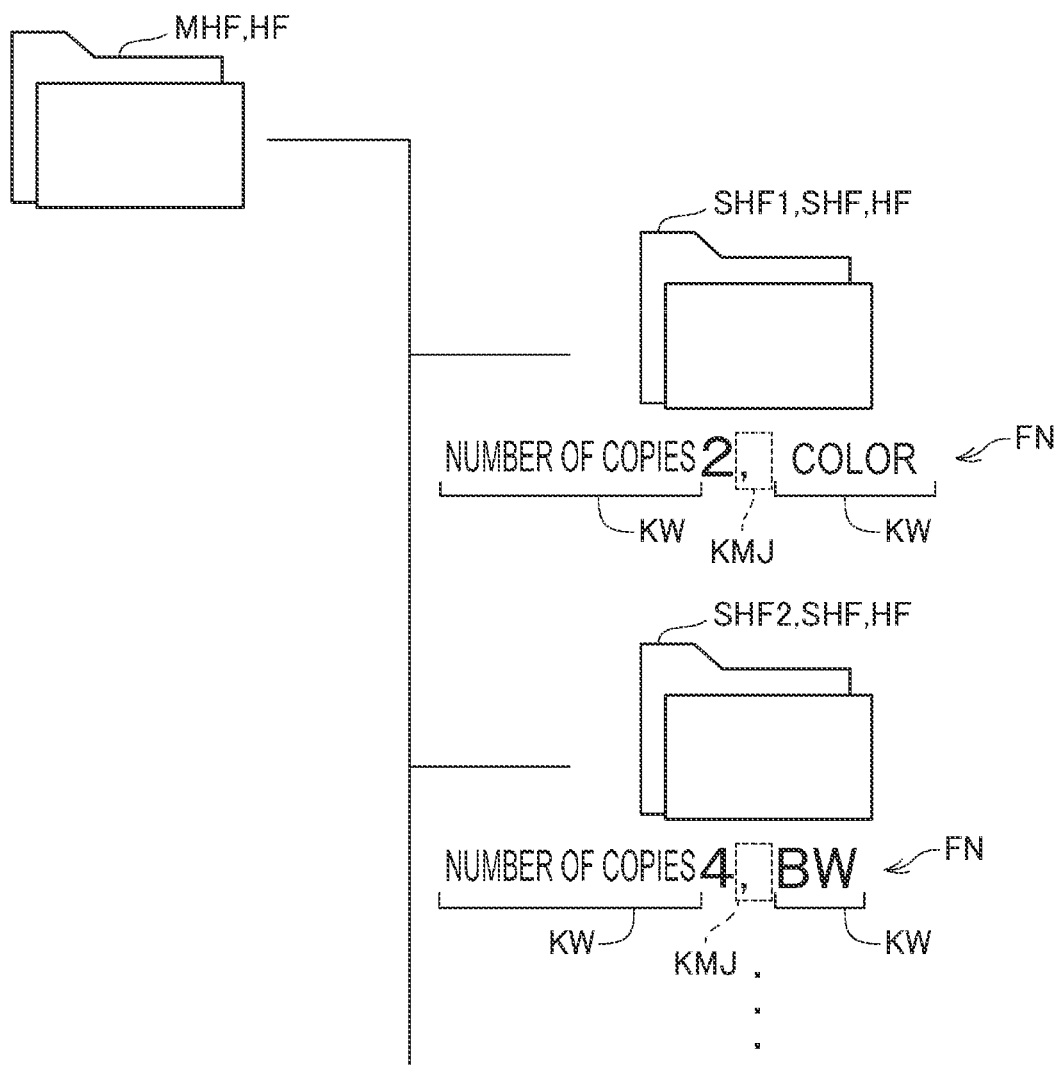
FIG. 2 shows an example of the configuration of a hot folder.

FIG. 2 shows an example of the configuration of the hot folder HF.

The printer storage unit 110 stores a main hot folder MHF and a sub hot folder SHF, as the hot folder HF.

The main hot folder MHF is equivalent to an example of a second hot folder. The sub hot folder SHF is equivalent to an example of a first hot folder.

The main hot folder MHF is a hot folder HF that can be prepared, edited, and erased by the manager of the printer 1. Therefore, a user of the printer 1 who is not the manager of the printer 1 cannot prepare, edit, or erase the main hot folder MHF.

In the description below, the manager of the printer 1 is referred to a "printer manager".

In the description below, the user of the printer 1 is referred to as a "printer user".

The sub hot folder SHF is a hot folder HF that can be prepared in the main hot folder MHF, as a subfolder of the main hot folder MHF. The sub hot folder SHF can be prepared by printer users including the printer manager.

The sub hot folder SHF may be a hot folder HF that can be erased from the main hot folder MHF by a printer user.

Each sub hot folder SHF is given a folder name FN including one or a plurality of keywords KW. When the folder name FN includes a plurality of keywords KW, a delimiter KMJ is inserted between the keywords KW. In FIG. 2, a comma "," is shown as an example of the delimiter KMJ. However, the delimiter KMJ is not limited to a comma and may be a predetermined character defined as the delimiter KMJ such as a blank or a colon. The delimiter KMJ may also be a character string formed of a plurality of characters. One keyword KW included in the folder name FN is made to correspond to one print condition in the keyword correspondence information 111. The keyword correspondence information 111 is information representing the correspondence between one keyword KW and one print condition.

In FIG. 2, a sub hot folder SHF1 is given a folder name FN "number of copies 2, color". In this folder name FN, "number of copies" and "color" are keywords KW.

In FIG. 2, a sub hot folder SHF2 is given a folder name FN "number of copies 4, BW". In this folder name FN, "number of copies" and "BW" are keywords KW.

Operations of the printing system 1000 will now be described.

First, an operation of the printing system 1000 performed when the printer manager registers a main hot folder MHF and keyword correspondence information 111 will be described.

Figure 3:
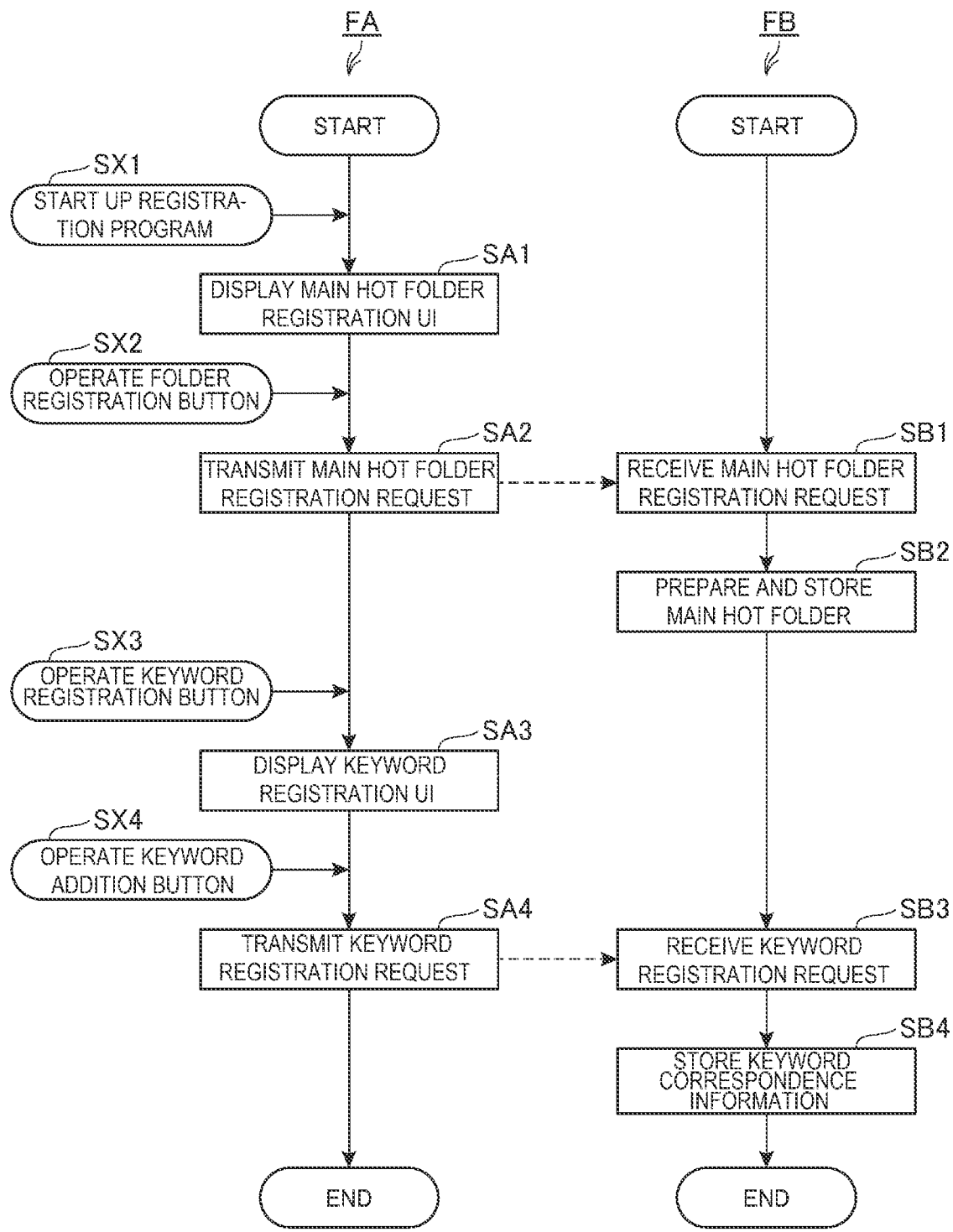
FIG. 3 is a flowchart showing an operation of the printing system.

FIG. 3 is a flowchart showing the operation of the printing system 1000.

In FIG. 3, a flowchart FA shows the operation of the PC 2 and a flowchart FB shows the operation of the printer 1.

The PC 2 performs the operation shown in the flowchart FA by the function of the registration program 212.

As shown in the flowchart FA, when the printer manager starts up the registration program 212 (step SX1), the PC control unit 20 causes the PC display unit 22 to display a user interface for registration of a main hot folder MHF (step SA1).

In the description below, this user interface is referred to as a "main hot folder registration UI" and is given a reference number "2021".

Figure 4:
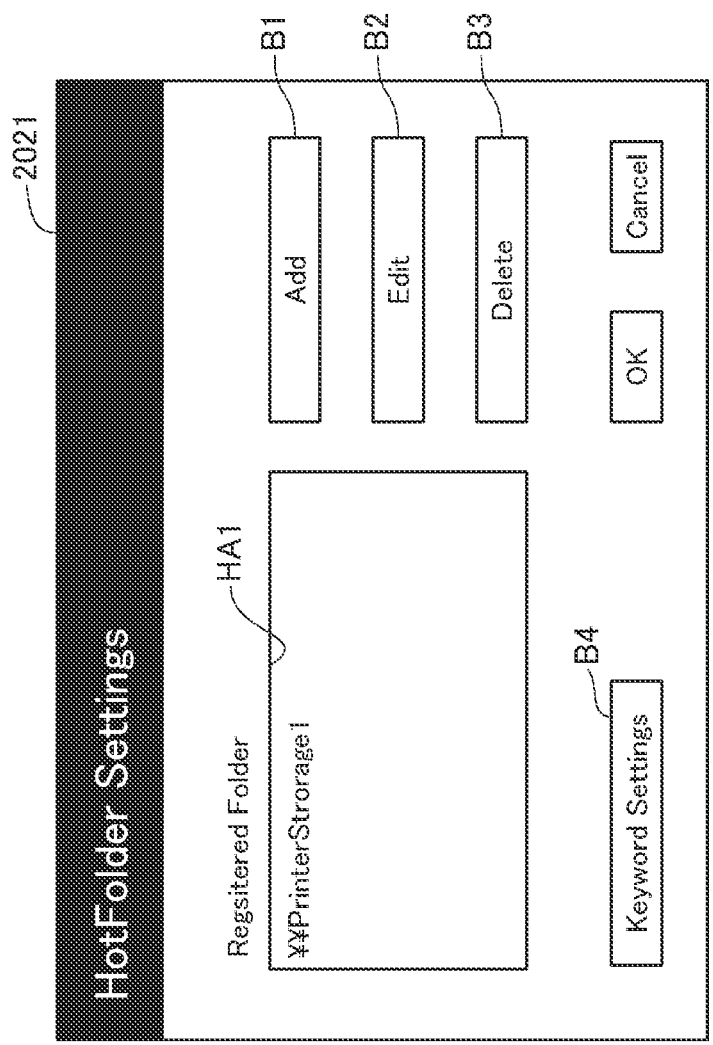
FIG. 4 shows an example of a main hot folder registration.

FIG. 4 shows an example of the main hot folder registration UI 2021.

The main hot folder registration UI 2021 has a display area HA1 where a registered main hot folder MHF is displayed. FIG. 4 shows a display area HA1 corresponding to a case where a main hot folder MHF of "YYPrinterStorage1" is registered.

The main hot folder registration UI 2021 has a folder registration button B1.

The folder registration button B1 is a software button for registering a new main hot folder MHF. When the folder registration button B1 is operated, the PC control unit 20 transmits, to the printer 1, a main hot folder registration request requesting the registration of a new main hot folder MHF. On receiving the main hot folder registration request, the printer control unit 10 of the printer 1 prepares a new main hot folder MHF and causes the printer storage unit 110 to store the prepared main hot folder MHF.

The main hot folder registration UI 2021 has a folder editing button B2.

The folder editing button B2 is a software button for the printer manager to edit the registered main hot folder MHF in a predetermined manner.

The main hot folder registration UI 2021 has a folder erasing button B3.

The folder erasing button B3 is a software button for erasing, from the printer storage unit 110, a main hot folder MHF selected by the printer manager from among the registered main hot folders MHF.

The main hot folder registration UI 2021 has a keyword registration button B4.

The keyword registration button B4 is a software button for registering a keyword KW. When the keyword registration button B4 is operated, the PC control unit 20 causes the PC display unit 22 to display a user interface for registering a keyword KW. The keyword registration button B4 may be a software button that is not operable when no main hot folder MHF is registered.

In the description below, this user interface is referred to as a "keyword registration UI" and is given a reference number "2022".

Referring back to FIG. 3, when the printer manager operates the folder registration button B1 (step SX2) after the main hot folder registration UI 2021 is displayed, the PC control unit 20 causes the PC communication unit 21 to transmit a main hot folder registration request to the printer 1 (step SA2).

As shown in the flowchart FB, the printer control unit 10 of the printer 1 causes the printer communication unit 11 to receive the main hot folder registration request (step SB1).

Subsequently, the printer control unit 10 prepares a new main hot folder MHF and causes the printer storage unit 110 to store the prepared main hot folder MHF (step SB2).

Referring back to the flowchart FA, when the printer manager operates the keyword registration button B4 (step SX3), the PC control unit 20 of the PC 2 causes the PC display unit 22 to display the keyword registration UI 2022 (step SA3).

Figure 5:
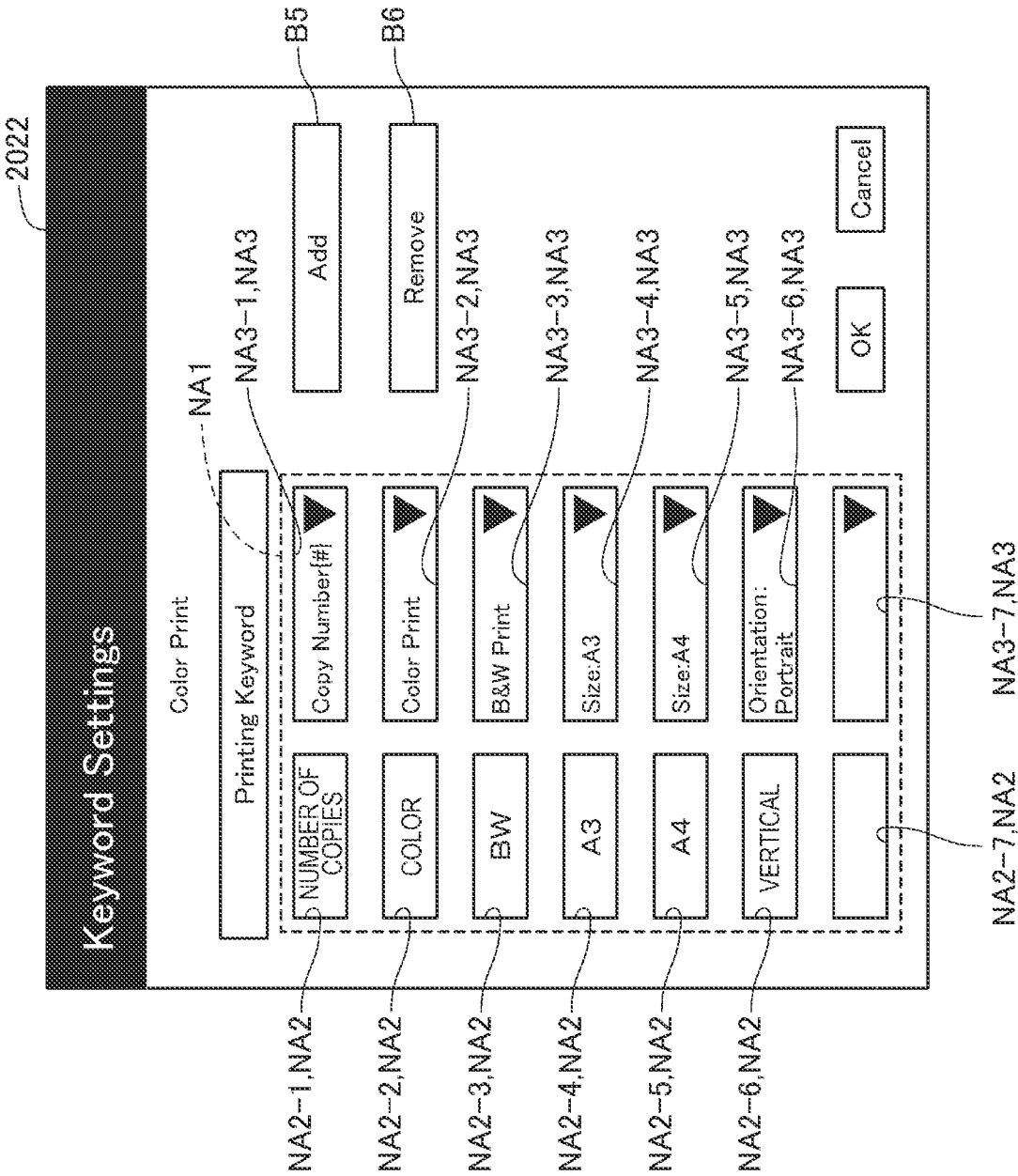
FIG. 5 shows an example of a keyword registration.

FIG. 5 shows an example of the keyword registration UI 2022.

The keyword registration UI 2022 has a correspondence input area NA1.

The correspondence input area NA1 is an area for inputting the correspondence between a keyword KW and a print condition. The correspondence input area NA1 has a plurality of keyword input areas NA2 arranged next to each other, each keyword input area NA2 configured for inputting one keyword KW. The correspondence input area NA1 also has a print condition character string input area NA3 where a character string representing a print condition is inputted, corresponding to each of the keyword input areas NA2.

The keyword input area NA2 is an area in which the printer manager can input any keyword KW.

In the keyword registration UI 2022 shown in FIG. 5, a keyword KW "number of copies" is inputted in a keyword input area NA2-1.

In the keyword registration UI 2022 shown in FIG. 5, a keyword KW "color" is inputted in a keyword input area NA2-2.

In the keyword registration UI 2022 shown in FIG. 5, a keyword KW "BW" is inputted in a keyword input area NA2-3.

In the keyword registration UI 2022 shown in FIG. 5, a keyword KW "A3" is inputted in a keyword input area NA2-4.

In the keyword registration UI 2022 shown in FIG. 5, a keyword KW "A4" is inputted in a keyword input area NA2-5.

In the keyword registration UI 2022 shown in FIG. 5, a keyword KW "vertical" is inputted in a keyword input area NA2-6.

In the keyword registration UI 2022 shown in FIG. 5, no keyword KW is inputted in a keyword input area NA2-7.

In the print condition character string input area NA3, a character string selected by the printer manager from among a plurality of character strings representing predetermined print conditions is inputted. When the printer manager operates the print condition character string input area NA3, character strings presenting print conditions are displayed in a pull-down list. When the printer manager selects one character string from the list, the selected character string is inputted in the print condition character string input area NA3.

In FIG. 5, a character string "Copy Number{#}" is inputted in a print condition character string input area NA3-1. The print condition represented by the character string "Copy Number{#}" designates a plural number as the numbers of copies.

In FIG. 5, a character string "Color Print" is inputted in a print condition character string input area NA3-2. The print condition represented by the character string "Color Print" designates that color printing is performed.

In FIG. 5, a character string "B&W Print" is inputted in a print condition character string input area NA3-3. The print condition represented by the character string "B&W Print" designates that black-and-white printing is performed.

In FIG. 5, a character string "Size:A3" is inputted in a print condition character string input area NA3-4. The print condition represented by the character string "Size:A3" designates A3 as the size of the print target sheet.

In FIG. 5, a character string "Size:A4" is inputted in a print condition character string input area NA3-5. The print condition represented by the character string "Size:A4" designates A4 as the size of the print target sheet.

In FIG. 5, a character string "Orientation:Portrait" is inputted in a print condition character string input area NA3-6. The print condition represented by the character string "Orientation:Portrait" designates vertical as the print form of the sheet.

In FIG. 5, a character string representing a print condition is not inputted in a print condition character string input area NA3-7.

The number of the keyword input areas NA2 and the print condition character string input areas NA3 included in the keyword registration UI 2022 is not limited to seven and may be more or fewer than seven.

The keyword registration UI 2022 has a keyword addition button B5.

The keyword addition button B5 is a software button for causing the printer storage unit 110 to store new keyword correspondence information 111, based on the keyword KW and the character string representing the print condition inputted in the correspondence input area NA1.

When keyword addition button B5 is operated, the PC control unit 20 causes the PC communication unit 21 to transmit a keyword registration request to the printer 1. The keyword registration request includes one or a plurality of pieces of keyword correspondence information 111 based on the keyword KW and the character string representing the print condition inputted in the correspondence input area NA1.

When the keyword addition button B5 is operated in the input state shown in FIG. 5, the keyword registration request includes six pieces of keyword correspondence information 111.

Specifically, the keyword registration request includes keyword correspondence information 111 to which the keyword KW "number of copies" and the character string "Copy Number{#}" are made to correspond.

The keyword registration request also includes keyword correspondence information 111 to which the keyword KW "color" and the character string "Color Print" are made to correspond.

The keyword registration request also includes keyword correspondence information 111 to which the keyword KW "BW" and the character string "B&W Print" are made to correspond.

The keyword registration request also includes keyword correspondence information 111 to which the keyword KW "A3" and the character string "Size:A3" are made to correspond.

The keyword registration request also includes keyword correspondence information 111 to which the keyword KW "A4" and the character string "Size:A4" are made to correspond.

The keyword registration request also includes keyword correspondence information 111 to which the keyword KW "vertical" and the character string "Orientation:Portrait" are made to correspond.

The keyword registration UI 2022 has a keyword deletion button B6.

The keyword deletion button B6 is a software button for erasing, from the printer storage unit 110, the keyword correspondence information 111 corresponding to a keyword selected by the printer manager from among the registered keywords KW.

Referring back to FIG. 3, when the printer manager operates the keyword addition button B5 (step SX4) after the keyword registration UI 2022 is displayed, the PC control unit 20 causes the PC communication unit 21 to transmit a keyword registration request to the printer 1 (step SA4).

As shown in the flowchart FB, on receiving the keyword registration request via the printer communication unit 11 (step SB3), the printer control unit 10 causes the printer storage unit 110 to store the one or plurality of pieces of keyword correspondence information 111 included in the received keyword registration request (step SB4).

An operation of the printing system 1000 performed when the printer user prepares a sub hot folder SHF will now be described. When the printer user prepares a sub hot folder SHF, the printer user has grasped a keyword KW registered by the printer manager, by a predetermined method such as via a manual.

Figure 6:
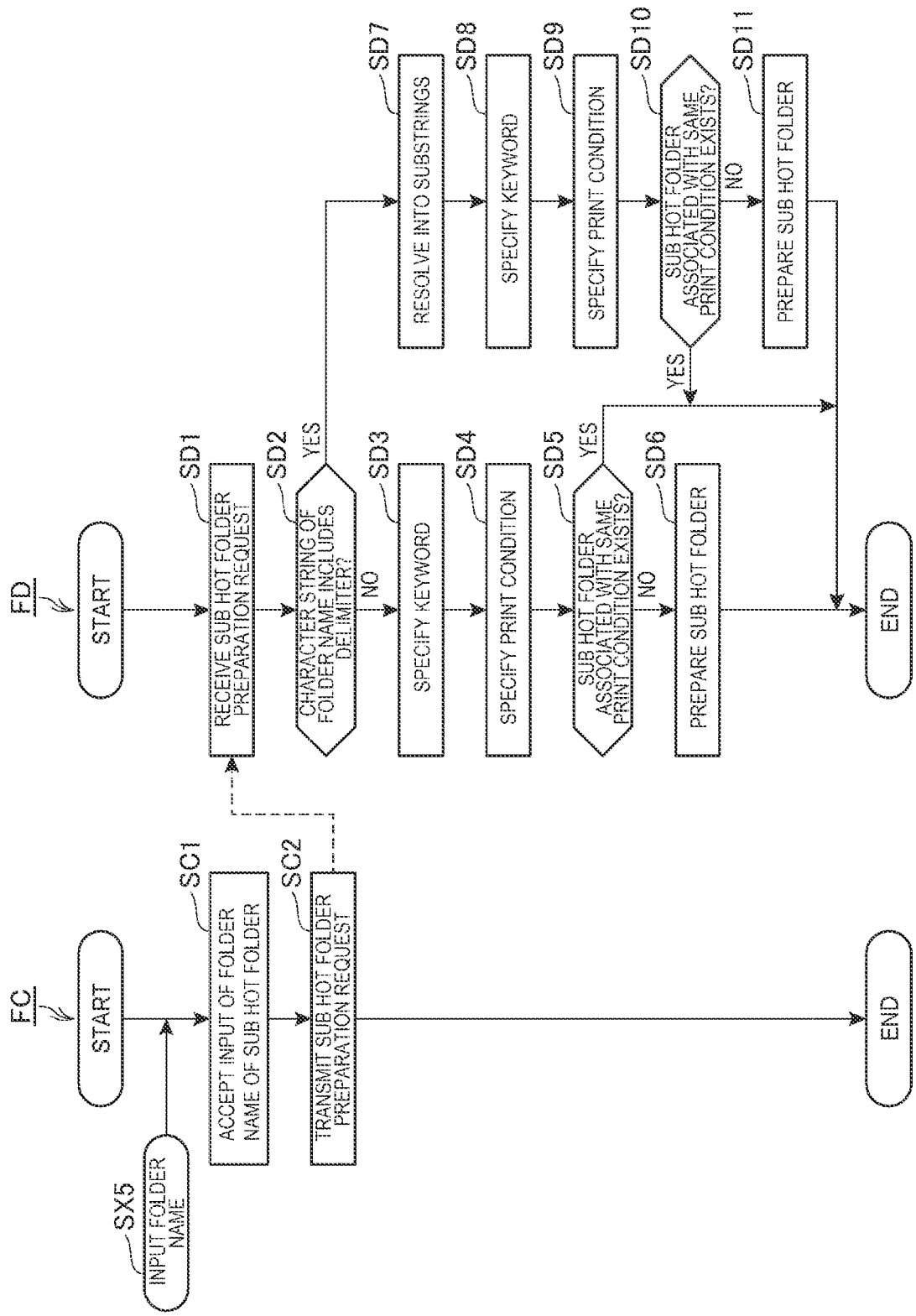
FIG. 6 is a flowchart showing an operation of the printing system.

FIG. 6 is a flowchart showing the operation of the printing system 1000.

In FIG. 6, a flowchart FC shows the operation of the PC 2 and a flowchart FD shows the operation of the printer 1.

As shown in the flowchart FC, when the printer user inputs a folder name FN of a sub hot folder SHF to the PC 2 (step SX5), the PC control unit 20 of the PC 2 accepts the input of the folder name FN (step SC1).

Subsequently, the PC control unit 20 causes the PC communication unit 21 to transmit sub hot folder preparation request information to the printer 1 (step SC2). The sub hot folder preparation request information includes information representing the folder name FN accepted in step SC1.

The printer control unit 10 of the printer 1 causes the printer communication unit 11 to receive the sub hot folder preparation request information (step SD1). In this embodiment, receiving the sub hot folder preparation request information is equivalent to an example of accepting the input of the folder name FN.

Subsequently, the printer control unit 10 determines whether the character string of the folder name FN included in the sub hot folder preparation request information includes a delimiter KMJ or not (step SD2).

When determining that the character string does not include a delimiter KMJ (NO in step SD2), the printer control unit 10 specifies a keyword KW corresponding to the character string of the folder name FN included in the sub hot folder preparation request information, referring to the keyword correspondence information 111 stored in the printer storage unit 110 (step SD3).

Subsequently, the printer control unit 10 specifies a print condition corresponding to the specified keyword KW, referring to the keyword correspondence information 111 stored in the printer storage unit 110 (step SD4).

When the print condition corresponding to the specified keyword KW is the print condition represented by the character string "Copy Number{#}", the printer control unit 10 specifies the print condition including a specific number of copies. For example, when the folder name FN included in the sub hot folder preparation request is "number of copies 2", the printer control unit 10 specifies "number of copies" as the keyword KW and specifies that "2 is designated as the number of copies" as the print condition, taking the numeral following "number of copies" into account.

The printer control unit 10 determines whether a sub hot folder SHF associated with a print condition that is the same as the print condition specified in step SD4 is stored in the printer storage unit 110 or not (step SD5).

When determining that a sub hot folder SHF associated with a print condition that is the same as the specified print condition is stored in the printer storage unit 110 (YES in step SD5), the printer control unit 10 ends the processing without preparing a sub hot folder SHF. This can prevent a plurality of sub hot folders SHF associated with the same print condition from being prepared in a main hot folder MHF.

Meanwhile, when determining that a sub hot folder SHF associated with a print condition that is the same as the specified print condition is not stored in the printer storage unit 110 (NO in step SD5), the printer control unit 10 prepares a sub hot folder SHF given the folder name FN included in the sub hot folder preparation request (step SD6).

In the operation shown in FIG. 6, the printer control unit 10 specifies a keyword KW corresponding to the character string of a folder name FN and specifies a print condition corresponding to the specified keyword KW, and thus determines whether a sub hot folder SHF associated with the same print condition exists or not. However, when the folder name FN does not include a delimiter KMJ, the printer control unit 10 may simply determine whether a sub hot folder SHF having the same folder name FN exists or not, without specifying a keyword KW and a print condition, and thus may determine whether a sub hot folder SHF associated with the same print condition exists or not.

Referring back to step SD2, when determining that the character string of the folder name FN includes a delimiter KMJ (YES in step SD2), the printer control unit 10 resolves the character string of the folder name FN included in the sub hot folder preparation request into substrings (step SD7).

For example, when the character string of the folder name is "number of copies 4, color, vertical", the character string delimited by the delimiter KMJ is resolved into three substrings, "number of copies 4", "color", and "vertical".

After resolving the character string of the folder name FN included in the sub hot folder preparation request into the substrings, the printer control unit 10 specifies a keyword KW corresponding to the substring with respect to each of the substrings, referring to the keyword correspondence information 111 stored in the printer storage unit 110 (step SD8).

For example, when the character string is resolved into the three substrings of "number of copies 4", "color", and "vertical" in step SD8, the printer control unit 10 specifies "number of copies" as a keyword KW corresponding to the substring of "number of copies 4", specifies "color" as a keyword KW corresponding to the substring of "color", and specifies "vertical" as a keyword KW corresponding to the substring of "vertical.

Subsequently, the printer control unit 10 specifies a print condition corresponding to the specified keyword KW, referring to the keyword correspondence information 111 stored in the printer storage unit 110 (step SD9).

When the print condition corresponding to the specified keyword KW is the print condition represented by the character string of "Copy Number{#}", the printer control unit 10 specifies the print condition including the number of copies, as in step SD4.

The printer control unit 10 determines whether a sub hot folder SHF associated with a print condition that is the same as the specified print condition is stored in the printer storage unit 110 or not (step SD10).

When determining that a sub hot folder SHF associated with a print condition that is the same as the specified print condition is stored in the printer storage unit 110 (YES in step SD10), the printer control unit 10 ends the processing without preparing a sub hot folder SHF. This can prevent a plurality of sub hot folders SHF associated with the same print condition from being prepared in a main hot folder MHF. That is, a plurality of sub hot folders SHF having different arrangements of keywords KW but associated with the same print condition can be prevented from being prepared in a main hot folder MHF.

Meanwhile, when determining that a sub hot folder SHF associated with a print condition that is the same as the specified print condition is not stored in the printer storage unit 110 (NO in step SD10), the printer control unit 10 prepares a sub hot folder SHF given the folder name FN included in the sub hot folder preparation request (step SD11).

In the operation shown in FIG. 6, the printer control unit 10 specifies a keyword KW corresponding to the character string of a folder name FN and specifies a print condition corresponding to the specified keyword KW, and thus determines whether a sub hot folder SHF associated with the same print condition exists or not. However, when the folder name FN includes a delimiter KMJ, the printer control unit 10 may determine whether a sub hot folder SHF having a folder name FN including all of the resolved substrings exists or not, without specifying a keyword KW and a print condition, and thus may determine whether a sub hot folder SHF associated with the same print condition exists or not.

An operation of the printing system 1000 performed when printing is carried out using a hot folder HF will now be described.

Figure 7:
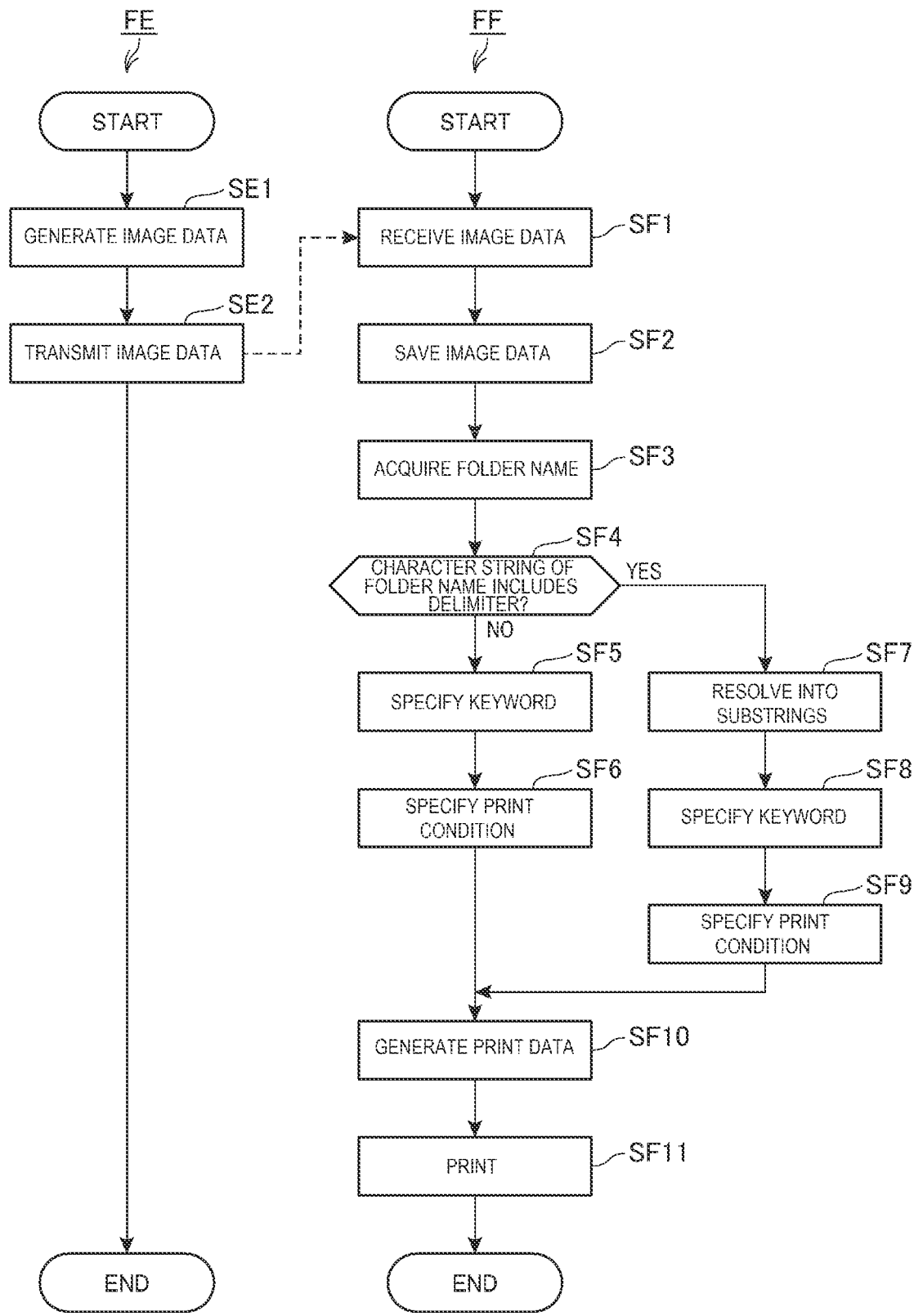
FIG. 7 is a flowchart showing an operation of the printing system.

FIG. 7 is a flowchart showing the operation of the printing system 1000.

In FIG. 7, a flowchart FE shows the operation of the PC 2 and a flowchart FF shows the operation of the printer 1.

As shown in the flowchart FE, the PC control unit 20 of the PC 2 generated image data by the function of the app 211 (step SE 1).

Subsequently, the PC control unit 20 causes the PC communication unit 21 to transmit the generated image data addressed to a sub hot folder SHF designated by the printer user (step SE2).

For example, in response to a trigger of image data being dragged and dropped on one sub hot folder SHF on a screen where sub hot folders SHF are displayed, the printer control unit 10 transmits the image data to the printer 1.

As shown in the flowchart FF, on receiving the image data via the printer communication unit 11 (step SF1), the printer control unit 10 of the printer 1 saved the image data in the sub hot folder SHF to which the image data is addressed (step SF2).

Subsequently, the printer control unit 10 monitors whether image data is saved in each sub hot folder SHF or not, and when image data is saved, the printer control unit 10 acquires the folder name FN of the sub hot folder SHF where image data is saved (step SF3).

Subsequently, the printer control unit 10 determines whether the character string of the acquired folder name FN includes a delimiter KMJ or not (step SF4).

When determining that the character string does not include a delimiter KMJ (NO in step SF4), the printer control unit 10 specifies a keyword KW corresponding to the acquired folder name FN, referring to the keyword correspondence information 111 stored in the printer storage unit 110 (step SF5).

Subsequently, the printer control unit 10 specifies a print condition corresponding to the specified keyword KW, referring to the keyword correspondence information 111 stored in the printer storage unit 110 (step SF6).

When the print condition corresponding to the specified keyword KW is the print condition represented by the character string of "Copy Number{#}", the printer control unit 10 specifies the print condition including the number of copies, as in step SD4.

Referring back to step SF4, when determining that the character string of the folder name FN includes a delimiter KMJ (YES in step SF4), the printer control unit 10 resolves the character string of the acquired folder name FN into substrings (step SF7).

Subsequently, the printer control unit 10 specifies a keyword KW corresponding to the substring with respect to each of the resolved substrings, referring to the keyword correspondence information 111 stored in the printer storage unit 110 (step SF8).

Subsequently, the printer control unit 10 specifies a print condition corresponding to each of the specified keywords KW, referring to the keyword correspondence information 111 stored in the printer storage unit 110 (step SF9).

When the print condition corresponding to the specified keyword KW is the print condition represented by the character string of "Copy Number{#}", the printer control unit 10 specifies the print condition including the number of copies, as in step SD4.

The printer control unit 10 generates print data, based on the print condition specified in step SF6 or step SF9 and the image data saved in the sub hot folder SHF whose folder name FN is acquired in step SF3 (step SF10).

The print data includes a print command and the image data saved in the sub hot folder SHF. The print data includes a command causing the printer 1 to print with the print condition specified in step SF6 or step SF9.

For example, when image data is saved in the sub hot folder SHF1 shown in FIG. 2, the printer control unit 10 generates print data including a command causing the printer 1 to perform color printing with the number of copies of 2.

Meanwhile, for example, when image data is saved in the sub hot folder SHF2 shown in FIG. 2, the printer control unit 10 generates print data causing the printer 1 to perform black and white printing with the number of copies of 4.

Subsequently, the printer control unit 10 causes the printing unit 12 to print, based on the generated print data (step SF11).

Modification Example

A modification example of the first embodiment will now be described.

In the first embodiment, the printer manager operates the PC 2 to register a main hot folder MHF and a keyword KW to the printer 1.

In this modification example, the printer manger operates the printer 1 to register a main hot folder MHF and a keyword KW to the printer 1.

In this modification example, the printer control unit 10 also executes the operation shown in the flowchart FA in FIG. 3 and causes the printer display unit 13 to display the main hot folder registration UI 2021 and the keyword registration UI 2022 in response to an operation by the printer manager. In this modification example, the registration program 212 may be not installed in the PC 2.

As described above, the printer 1 has: the printer storage unit 110 storing a sub hot folder SHF that is given a folder name FN including a keyword KW corresponding to a print condition and is thus associated with the print condition; and the printer control unit 10 preparing a sub hot folder SHF and causing the printer storage unit 110 to store the prepared sub hot folder SHF. The printer control unit 10 accepts an input of a folder name FN, and prepares a sub hot folder SHF given the accepted folder name FN and causes the printer storage unit 110 to store the sub hot folder SHF when a sub hot folder SHF associated with a print condition that is the same as the print condition corresponding to the keyword KW included in the accepted folder name FN is not stored in the printer storage unit 110.

The control method for the printer includes: storing a sub hot folder SHF that is given a folder name FN including a keyword KW corresponding to a print condition and is thus associated with the print condition; accepting an input of a folder name FN; and preparing and storing a sub hot folder SHF given the accepted folder name FN, when a sub hot folder SHF associated with a print condition that is the same as the print condition corresponding to the keyword KW included in the accepted folder name FN is not stored.

In the printer 1 and the control method for the printer 1, a keyword KW from which the printer user can grasp a print condition is set by the printer manager. Therefore, the printer user can easily grasp what kind of print condition a print condition associated with a sub hot folder SHF is, based on the folder name FN thereof. Thus, in printing using a hot folder HF, printing with a print condition that is not intended by the printer user can be restrained. Also, since a plurality of sub hot folders SHF associated with the same print condition are not prepared, the printer user need not search through many sub hot folders SHF to find a sub hot folder SHF associated with a desired print condition. Therefore, the convenience of the printer user in printing using a hot folder HF can be improved.

The printer control unit 10 gives a folder name FN including a plurality of keywords KW to a sub hot folder SHF.

Thus, the printer user can easily grasp what kinds of print conditions the plurality of print conditions associated with the sub hot folder SHF are, based on the folder name FN.

The printer control unit 10 gives a folder name FN having a delimiter KMJ inserted between keywords KW to a sub hot folder SHF.

Thus, the printer user can easily grasp the demarcation between the keywords KW and therefore can easily grasp what kinds of print conditions the plurality of print conditions associated with the sub hot folder SHF are, based on the folder name FN.

The printer control unit 10 resolves the character string of the folder name FN into a plurality of substrings, based on the delimiter KMJ, and collates each of the resolved substrings with the keyword KW, and thus determines whether a sub hot folder SHF associated with the same print condition as the print condition corresponding to the keyword KW included in the accepted folder name FN is stored in the printer storage unit 110 or not.

In the case of folder names FN including a plurality of keywords KW, the print condition associated with the sub hot folder SHF can be the same even if the arrangement of the keywords KW is different. For example, in the case of "number of copies 2, color" and "color, number of copies 2", the arrangement of the keywords KW is different but the print condition associated with the sub hot folder SHF is the same. Therefore, in the case of folder names FN including a plurality of keywords KW, a plurality of sub hot folders SHF associated with the same print condition may be prepared with different folder names FN. To cope with this, the character string of the folder name FN is resolved into substrings, based on the delimiter KMJ, and each of the substrings is collated with the keyword KW. Thus, the preparation of a plurality of sub hot folders SHF associated with the same print conditions can be securely prevented.

The printer control unit 10 generates a sub hot folder SHF as a subfolder in a main hot folder MHF. The sub hot folder SHF is a hot folder that can be prepared by printer users including the printer manager. The main hot folder MHF is a hot folder that can be prepared by the printer manager but cannot be prepared by a printer user who is not the printer manager.

According to the related art, when the associated print condition differs, the printer manager needs to prepare a hot folder HF for each of the different print conditions. Therefore, according to the related art, the number of hot folders HF managed by the printer manager is the number of print conditions associated with the hot folders HF. In this embodiment, since the printer user can prepare a sub hot folder SHF in a main hot folder MHF, the hot folder HF managed by the printer manager may be the main hot folder MHF only. Thus, the burden on the printer manager managing the hot folder HF can be reduced.

The printer control unit 10 acquires the folder name FN of a sub hot folder SHF where image data is saved, specifies a keyword KW included in the acquired folder name FN, specifies a print condition corresponding to the specified keyword KW, and causes the printing unit 12 to print, based on the specified print condition.

Thus, printing based on the image data saved in the sub hot folder SHF can be performed with the print condition associated therewith by the folder name FN.

When giving a folder name FN including a plurality of keywords KW, the printer control unit 10 gives a folder name FN having a delimiter KMJ inserted between keywords KW to a sub hot folder SHF. The printer control unit 10 resolves the character string of the acquired folder name FN into a plurality of substrings, based on the delimiter KMJ, specifies a keyword KW corresponding to each of the resolved substrings, specifies a print condition for each of the specified keywords KW, and causes the printing unit 12 to print, based on each of the specified print conditions.

Thus, even when the folder name FN includes a plurality of keywords KW, and a plurality of print conditions are associated with the sub hot folder SHF, printing based on the image data saved in the sub hot folder SHF can be performed with the plurality of print conditions associated therewith by the folder name FN.

Second Embodiment

A second embodiment will now be described.

Figure 8:
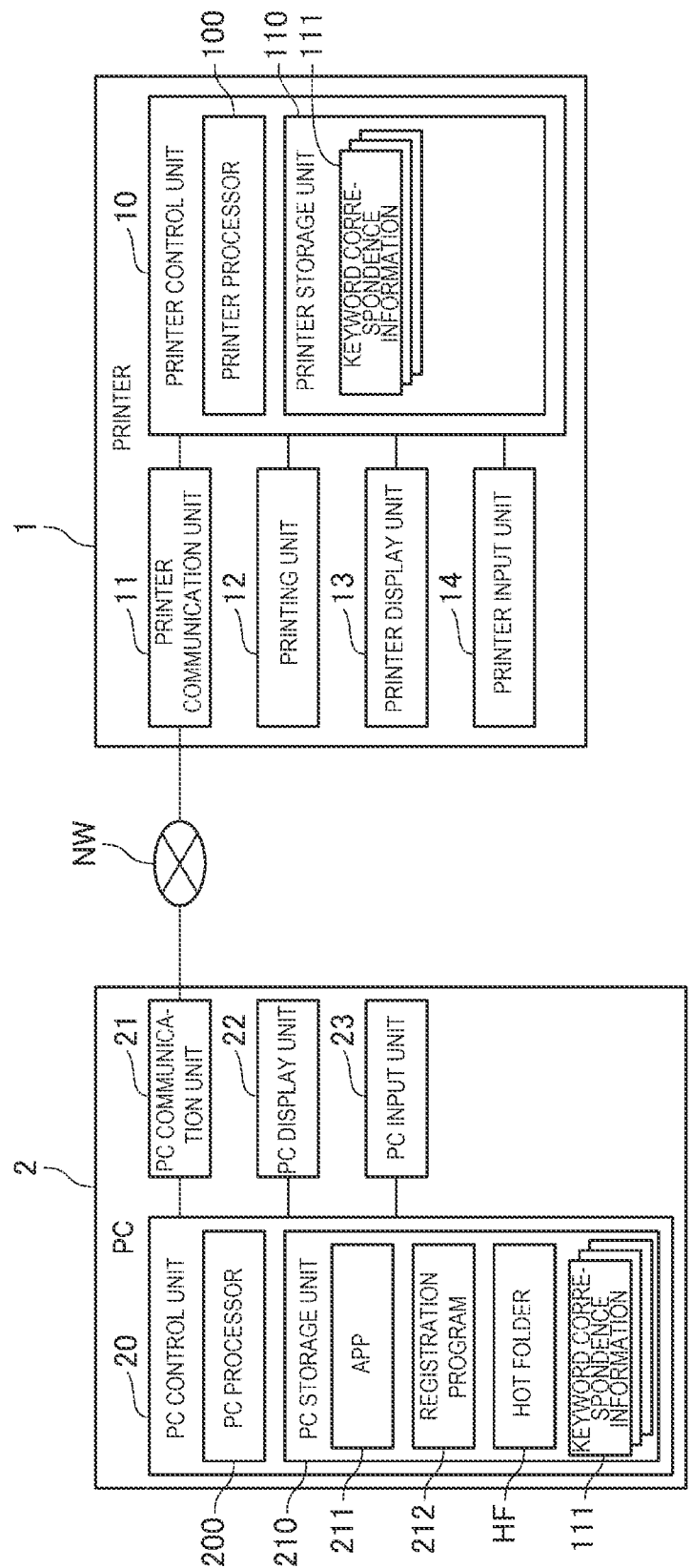
FIG. 8 shows the configuration of a printing system.

FIG. 8 shows the configuration of a printing system 1000 according to the second embodiment.

In FIG. 8, the configurations of components of a printer 1 and a PC 2 in the second embodiment that are the same as the configurations of components in the first embodiment are denoted by the same reference signs and are not described further in detail.

In the second embodiment, the PC 2 is equivalent to an example of the information processing device and the printer 1 is equivalent to an example of the printing device.

In the second embodiment, the PC control unit 20 is equivalent to an example of the control unit and the PC storage unit 210 is equivalent to an example of the storage unit.

As clear from the comparison between FIGS. 1 and 8, the PC storage unit 210 in the second embodiment stores keyword correspondence information 111 and a hot folder HF. Meanwhile, the printer storage unit 110 in the second embodiment does not store a hot folder HF. That is, the printer 1 in the second embodiment is not a printing device having a hot folder HF built therein.

The registration program 212 in the second embodiment is a program for registering a main hot folder MHF to the PC 2 and registering a keyword KW to the PC 2 and the printer 1. Registering a main hot folder MHF to the PC 2 means storing a new main hot folder MHF in the PC storage unit 210. Registering a keyword KW to the PC 2 and the printer 1 means storing new keyword correspondence information 111 in the PC storage unit 210 and the printer storage unit 110.

Operations of the printing system 1000 according to the second embodiment will now be described.

First, an operation of the printing system 1000 performed when the printer manager registers a main hot folder MHF and keyword correspondence information 111 will be described.

Figure 9:
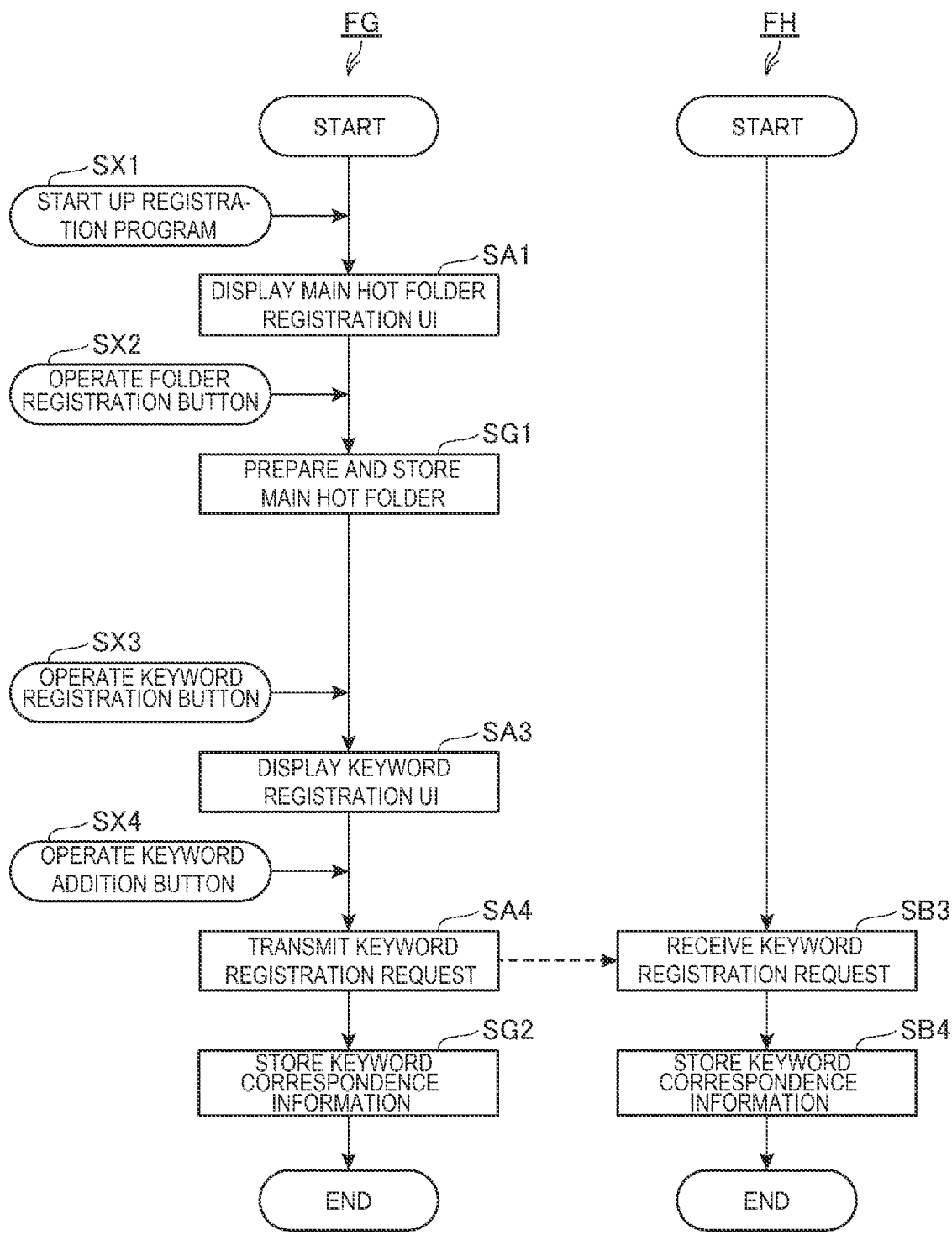
FIG. 9 is a flowchart showing an operation of the printing system.

FIG. 9 is a flowchart showing the operation of the printing system 1000.

In FIG. 9, a flowchart FG shows the operation of the PC 2 and a flowchart FH shows the operation of the printer 1.

The operation shown in the flowchart FG in FIG. 9 is executed by the function of the registration program 212.

In FIG. 9, the same steps as in the flowchart shown in FIG. 3 are denoted by the same step numbers and the detailed description thereof is omitted where appropriate.

As shown in the flowchart FG, when the printer manager operates the folder registration button B1 (step SX2) after the main hot folder registration UI 2021 is displayed, the PC control unit 20 prepares a new main hot folder MHF and causes the PC storage unit 210 to store the prepared main hot folder MHF (step SG1).

When the printer manager operates the keyword addition button B5 (step SX4) after the keyword registration UI 2022 is displayed, the PC control unit 20 causes the PC communication unit 21 to transmit a keyword registration request to the printer 1 (step SA4) and causes the PC storage unit 210 to store one or a plurality of pieces of keyword correspondence information 111 (step SG2).

Next, the operation of the PC 2 performed when the printer user prepares a sub hot folder SHF will be described.

This operation is described, referring to FIG. 6.

When accepting the folder name FN of a sub hot folder SHF, the PC control unit 20 executes the processing from step SD2 onward, without executing step SC2. When the PC control unit 20 is the main executor of the processing of step SD2, the PC control unit 20 determines whether the character string of the accepted folder name FN includes a delimiter KMJ or not. When the PC control unit 20 is the main executor of the processing of steps SD6 and SD11, the PC control unit 20 prepares a sub hot folder SHF given the accepted folder name FN.

An operation of the printing system 1000 performed when printing is carried out using a hot folder HF will now be described.

The PC control unit 20 generates image data by the function of the app 211 and then saves the generated image data in a sub hot folder SHF designated by the printer user.

The printer control unit 10 accesses the PC 2 and monitors whether image data is saved in a sub hot folder SHF or not. When determining that image data is saved in a sub hot folder SHF, the printer control unit 10 acquires, from the PC 2, the folder name FN of the sub hot folder SHF where the image data is saved and the saved image data. Then, the printer control unit 10 executes the processing from step SF4 onward in the flowchart FF shown in FIG. 7.

The second embodiment has effects similar to those of the first embodiment.

Third Embodiment

A third embodiment will now be described.

Figure 10:
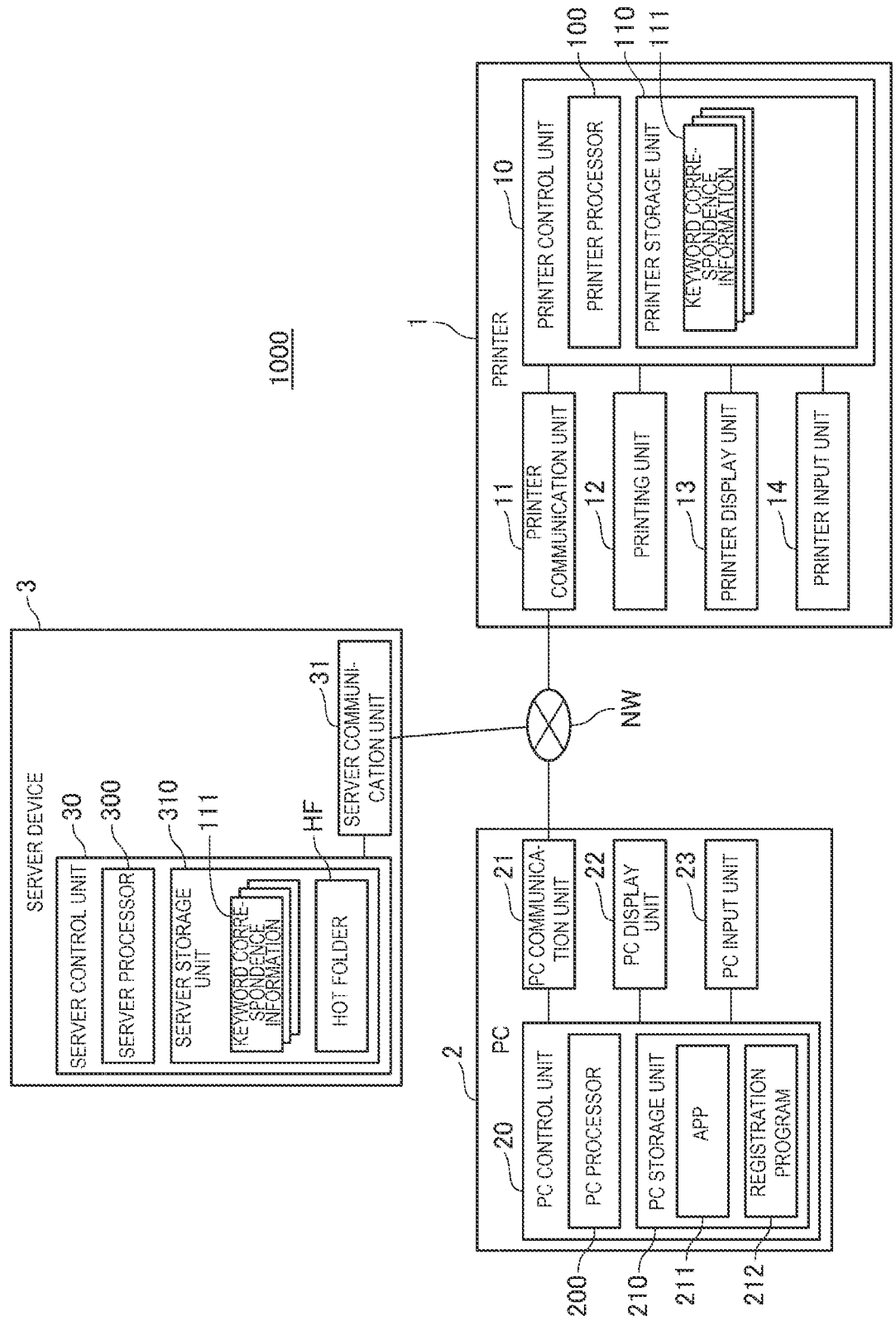
FIG. 10 shows the configuration of a printing system.

FIG. 10 shows the configuration of a printing system 1000 according to the third embodiment.

In FIG. 10, the configurations of components of a printer 1 and a PC 2 in the third embodiment that are the same as the configurations of components in the first embodiment are denoted by the same reference signs and are not described further in detail.

In the third embodiment, as clear from the comparison with the first and second embodiments, the printing system 1000 has a server device 3 storing a hot folder HF. The server device 3 can communicate with the PC 2 and the printer 1 via the network NW.

In the third embodiment, the server device 3 is equivalent to an example of the information processing device.

The printer storage unit 110 in the third embodiment does not store a hot folder HF, similarly to the printer storage unit 110 in the second embodiment. That is, the printer 1 in the third embodiment, too, is not a printing device having a hot folder HF built therein.

The server device 3 has a server control unit 30 and a server communication unit 31.

In the third embodiment, the server control unit 30 is equivalent to an example of the control unit.

The server control unit 30 has a server processor 300 which is a processor executing a program, such as a CPU or an MPU, and a server storage unit 310, and controls each part of the server device 3. In the server control unit 30, the server processor 300 reads out a program stored in the server storage unit 310 and executes various kinds of processing via hardware and software.

In the third embodiment, the server storage unit 310 is equivalent to an example of the storage unit.

The server storage unit 310 stores a program executed by the server processor 300 and data processed by the server processor 300. The server storage unit 310 stores a program executed by the server processor 300, keyword correspondence information 111, a hot folder HF, and various other data. The server storage unit 310 has a non-volatile storage area. The server storage unit 310 may have a volatile storage area and form a work area for the server processor 300.

The server communication unit 31 has communication hardware communicating according to a predetermined communication standard and communicates with the PC 2 and the printer 1 coupled via the network NW under the control of the server control unit 30.

The registration program 212 in the third embodiment is a program for registering a main hot folder MHF to the server device 3 and registering a keyword KW to the server device 3 and the printer 1. Registering a main hot folder MHF to the server device 3 means storing a new main hot folder MHF in the server storage unit 310. Registering a keyword KW to the server device and the printer 1 means storing new keyword correspondence information 111 in the server storage unit 310 and the printer storage unit 110.

Operations of the printing system 1000 according to the third embodiment will now be described.

First, an operation of the printing system 1000 performed when the printer manager registers a main hot folder MHF and keyword correspondence information 111 will be described.

Figure 11:
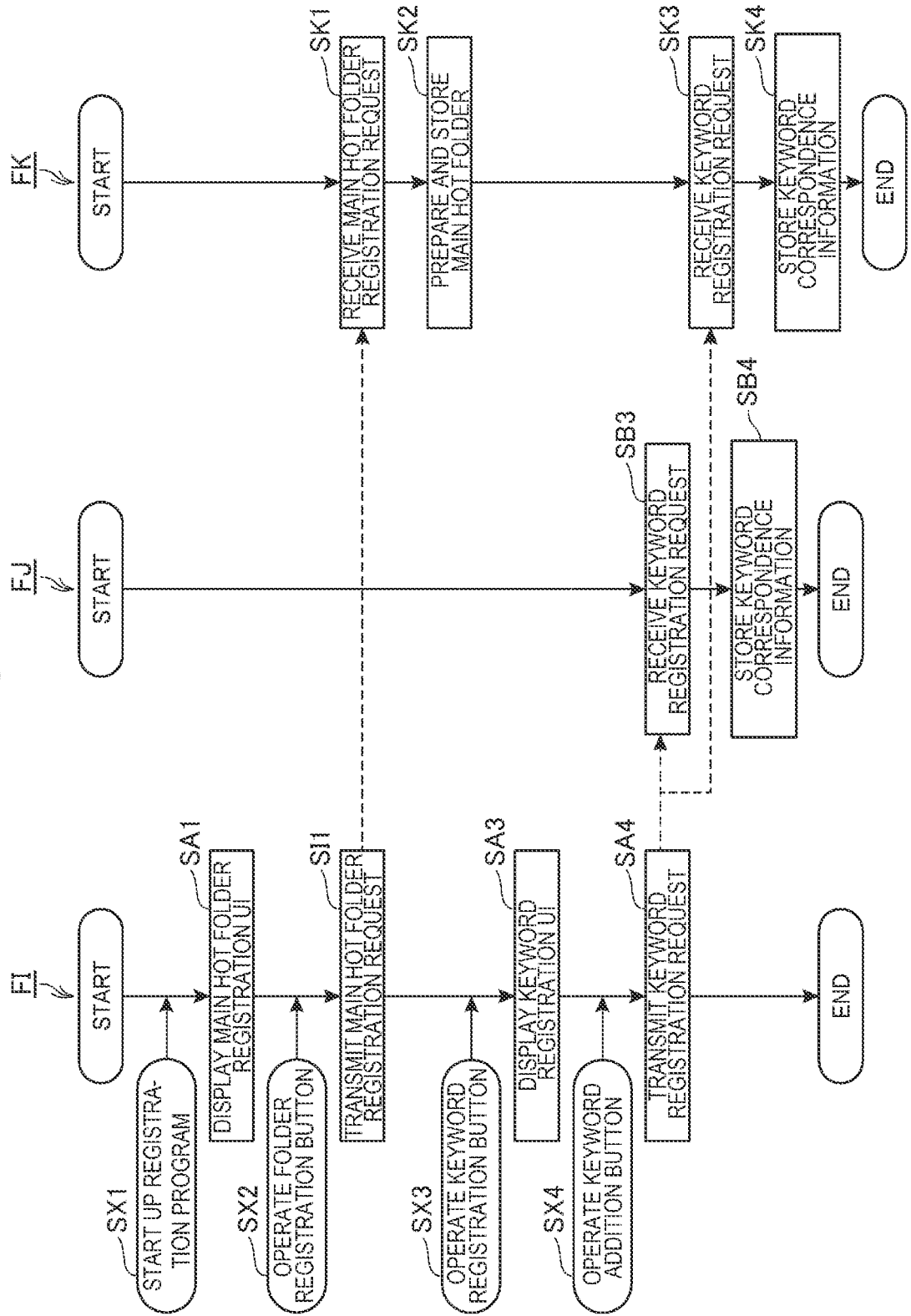
FIG. 11 is a flowchart showing an operation of the printing system.

FIG. 11 is a flowchart showing the operation of the printing system 1000.

In FIG. 11, a flowchart FI shows the operation of the PC 2, a flowchart FJ shows the operation of the printer 1, and a flowchart FK shows the operation of the server device 3.

In FIG. 11, the same steps as in the flowchart shown in FIG. 3 are denoted by the same step numbers and the detailed description thereof is omitted where appropriate.

As shown in the flowchart FI, when the printer manager operates the folder registration button B1 (step SX2) after the main hot folder registration UI 2021 is displayed, the PC control unit 20 transmits a main hot folder registration request to the server device 3 (step SI1).

As shown in the flowchart FK, the server control unit 30 of the server device 3 causes the server communication unit 31 to receive the main hot folder registration request (step SK1).

Subsequently, the server control unit 30 prepares a new main hot folder MHF and causes the server storage unit 310 to store the prepared main hot folder MHF (step SK2).

When the printer manager operates the keyword addition button B5 (step SX4) after the keyword registration UI 2022 is displayed, the PC control unit 20 causes the PC communication unit 21 to transmit a keyword registration request to the printer 1 and the server device 3 (step SA4).

As shown in the flowchart FK, on receiving the keyword registration request via the server communication unit 31 (step SK3), the server control unit 30 causes the server storage unit 310 to store the one or plurality of pieces of keyword correspondence information 111 included in the received keyword registration request (step SK4).

An operation of the printing system 1000 performed when the printer user prepares a sub hot folder SHF will now be described.

This operation is described, referring to the flowchart of FIG. 6.

In the third embodiment, when the printer user prepares a sub hot folder SHF, the PC 2 performs the operation shown in the flowchart FC in FIG. 6 and the server device 3 performs the operation shown in the flowchart FD in FIG. 6.

An operation of the printing system 1000 performed when printing is carried out using a hot folder HF will now be described.

The PC control unit 20 generates image data by the function of the app 211 and then saves the generated image data in a sub hot folder SHF designated by the printer user.

The printer control unit 10 accesses the PC 2 and monitors whether image data is saved in a sub hot folder SHF or not. When determining that image data is saved in a sub hot folder SHF, the printer control unit 10 acquires, from the PC 2, the folder name FN of the sub hot folder SHF where the image data is saved and the saved image data. Then, the printer control unit 10 executes the processing from step SF4 onward in the flowchart FF shown in FIG. 7.

The third embodiment has effects similar to those of the first embodiment.

Each of the foregoing embodiments represents one aspect and any modification and application can be made thereto.

The control method for the printer 1, the PC 2, and the server device 3 can be implemented by causing the processor of each of these devices to execute a control program corresponding to the control method. The control program can be recorded in a computer-readable recording medium. As the recording medium, a magnetic or optical recording medium, or a semiconductor memory device can be used. Specifically, a portable recording medium such as a flexible disk, an HDD, a CD-ROM (compact disk read-only memory), a DVD, a Blu-ray (trademark registered) disc, a magneto-optical disk, a flash memory or a card-type recording medium, or a fixed recording medium may be employed. The recording medium may be a non-volatile storage device such as a RAM, a ROM or an HDD that is an internal storage device provided in the printer 1, the PC 2, and the server device 3. The control program corresponding to the control method for the printer 1, the PC 2, and the server device 3 may be stored in a predetermined server or the like in advance and may be downloaded from this server to the printer 1, the PC 2, and the server device 3, so as to implement the control method.

The print conditions corresponding to the keywords KW is not limited to the print conditions of the character strings shown in FIG. 5 and may further include other types of print conditions or may include fewer print conditions.

The printer 1 may have other functions than the printing function, such as a scanning function and a facsimile function.

The functions of the printer control unit 10, the PC control unit 20, and the server control unit 30 may be implemented by a plurality of processors or semiconductor chips.

Each component shown in FIGS. 1, 8, and 10 is simply an example and is not particularly limiting. Individual pieces of hardware corresponding to the respective components need not necessarily be installed. A single processor can execute a program to implement functions of the respective components. Also, a part of the functions implemented by software may be implemented by hardware, and a part of the functions implemented by hardware may be implemented by software. Moreover, any change can be made to the specific details of the configurations of the other parts of the printer 1, the PC 2, and the server device 3.

The processing steps of the operations shown in FIGS. 3, 6, 7, 9, and 11 are provided by dividing the processing according to the main processing content in order to facilitate understanding of the operation of each device in the printing system 1000. The way the processing is divided into steps and the names thereof shown are not limiting. Depending on the processing content, the processing can be divided into more processing steps and can be divided in such a way that one processing step includes further processing. Also, the order of the processing steps may be changed where appropriate.

What is claimed is:

1. An information processing device comprising:
    a memory storing a first hot folder that is given a folder name including a keyword corresponding to a print condition and is thus associated with the print condition; and
    a central processing unit (CPU) preparing the first hot folder and causing the memory to store the first hot folder that is prepared, wherein the CPU control unit
        accepts an input of the folder name,
        determines the first hot folder associated with the print condition that is the same as the print condition corresponding to the keyword included in the folder name that is accepted is not stored in the memory,
        prepares, based on the determination that the first hot folder associated with the print condition that is the same as the print condition corresponding to the keyword included in the folder name that is accepted is not stored in the memory, the first hot folder given the folder name that is accepted, and
        causes the memory to store the prepared first hot folder given the folder name that is accepted.

2. The information processing device according to claim 1, wherein
    the CPU gives the folder name including a plurality of keywords to the first hot folder, and
    the plurality of keywords includes the keyword.

3. The information processing device according to claim 2, wherein the CPU gives the folder name having a delimiter inserted between the plurality of keywords to the first hot folder.

4. The information processing device according to claim 3, wherein the CPU
    resolves a character string of the folder name into a plurality of substrings, based on the delimiter, and
    collates each of the plurality of substrings that is resolved with the keyword, and thus determines whether the first hot folder associated with the print condition that is the same as the print condition corresponding to the keyword included in the folder name that is accepted is stored in the memory or not.

5. The information processing device according to claim 1, wherein
    the CPU generates the first hot folder as a subfolder in a second hot folder,
    the first hot folder is a hot folder that can be prepared by a user of a printing device including a manager of the printing device, and
    the second hot folder is a hot folder that can be prepared by the manager but cannot be prepared by the user who is not the manager.

6. A control method for an information processing device, the control method comprising:
    storing, in a memory, a first hot folder that is given a folder name including a keyword corresponding to a print condition and is thus associated with the print condition;
    accepting an input of the folder name;
    determining the first hot folder associated with the print condition that is the same as the print condition corresponding to the keyword included in the folder name that is accepted is not stored in the memory;
    preparing, based on the determination that the first hot folder associated with the print condition that is the same as the print condition corresponding to the keyword included in the folder name that is accepted is not stored in the memory, the first hot folder given the folder name that is accepted; and storing, in the memory, the prepared first hot folder given the folder name that is accepted.

7. A printing device comprising:
a printing unit;
a memory storing a first hot folder that is given a folder name including a keyword corresponding to a print condition and is thus associated with the print condition; and
a central processing unit (CPU)
monitoring whether image data is saved in the first hot folder or not, and
causing the printing unit to print based on the image data saved with the print condition associated with the first hot folder, when the image data is saved in the first hot folder, wherein the CPU
accepts an input of the folder name,
determines the first hot folder associated with the print condition that is the same as the print condition corresponding to the keyword included in the folder name that is accepted is not stored in the memory,
prepares, based on the determination that the first hot folder associated with the print condition that is the same as the print condition corresponding to the keyword included in the folder name that is accepted is not stored in the memory, the first hot folder given the folder name that is accepted, and
causes the memory to store the prepared first hot folder given the folder name that is accepted.

8. The printing device according to claim 7, wherein the CPU
acquires the folder name of the first hot folder in which the image data is saved,
specifies the keyword including the folder name that is acquired,
specifies the print condition corresponding to the keyword that is specified, and
causes the printing unit to print, based on the print condition that is specified.

9. The printing device according to claim 8, wherein the CPU
when giving the folder name including a plurality of keywords, gives the folder name having a delimiter inserted between the plurality of keywords to the first hot folder, wherein the plurality of keywords includes the keyword,
resolves a character string of the folder name that is acquired into a plurality of substrings, based on the delimiter,
specifies the keyword corresponding to a substring of the plurality of substrings, with respect to each of the plurality of substrings that is resolved,
specifies the print condition with respect to each of the plurality of keywords that is specified, and
causes the printing unit to print, based on the print condition that is specified with respect to each of the plurality of keywords.

* * * * *